(12) United States Patent
Park et al.

(10) Patent No.: US 11,431,020 B2
(45) Date of Patent: Aug. 30, 2022

(54) BLACK PHOSPHORUS-POLYMER SOLID ELECTROLYTE, PRODUCTION METHOD THEREOF, AND SECONDARY BATTERY INCLUDING THE ELECTROLYTE

(71) Applicant: RESEARCH & BUSINESS FOUNDATION SUNGKYUNKWAN UNIVERSITY, Suwon-si (KR)

(72) Inventors: Ho Seok Park, Suwon-si (KR); Harpalsinh Hardevsinh Rana, Suwon-si (KR); Jeong Hee Park, Suwon-si (KR); Duk Joon Kim, Suwon-si (KR); Kang-Ho Shin, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 239 days.

(21) Appl. No.: 16/869,832

(22) Filed: May 8, 2020

(65) Prior Publication Data

US 2020/0358128 A1    Nov. 12, 2020

(30) Foreign Application Priority Data

May 8, 2019    (KR) ........................ 10-2019-0053845

(51) Int. Cl.
*H01M 10/056*    (2010.01)

(52) U.S. Cl.
CPC .. *H01M 10/056* (2013.01); *H01M 2300/0082* (2013.01); *H01M 2300/0091* (2013.01)

(58) Field of Classification Search
CPC .................................................. H01M 10/056
See application file for complete search history.

(56) References Cited

PUBLICATIONS

Tong et. al; "Deformable and flexible electrospun nanofiber-supported cross-linked gel polymer electrolyte membranes for high safety lithium-ion batteries" (Year: 2017).*

* cited by examiner

*Primary Examiner* — Nathanael T Zemui
(74) *Attorney, Agent, or Firm* — NSIP Law

(57) ABSTRACT

Disclosed is a black phosphorus-polymer composite solid electrolyte including a polymer network structure in which nanofibers made of a second polymer material are connected to each other; a first polymer material received in the polymer network structure and having ionic conductivity; black phosphorus dispersed in the first polymer material, wherein the black phosphorus has an oxygen containing functional group; and a lithium salt compound contained in the first polymer material.

18 Claims, 13 Drawing Sheets

BLACK PHOSPHORUS-POLYMER SOLID ELECTROLYTE, PRODUCTION METHOD THEREOF, AND SECONDARY BATTERY INCLUDING THE ELECTROLYTE

CROSS-REFERENCE TO RELATED APPLICATION

This application claims a benefit under 35 U.S.C. § 119(a) of Korean Patent Application No. 10-2019-0053845 filed on May 8, 2019, on the Korean Intellectual Property Office, the entire disclosure of which is incorporated herein by reference for all purposes.

BACKGROUND

1. Field

The present disclosure relates to a solid electrolyte for a secondary battery, a production method thereof and a secondary battery having the same.

2. Description of Related Art

A lithium-ion battery which has the highest share in a secondary battery market has various advantages such as high theoretical capacity relative to mass, and high cycle stability. However, high instability and reactivity of a material of the lithium-ion battery cause various accidents such as fire and explosion.

In order to solve this safety problem, an organic/inorganic solid electrolyte has replaced a conventional organic solvent electrolyte with high ignition ability. Among the organic/inorganic solid electrolytes, a PEO-based polymer all-solid electrolyte which exhibits high ionic solubility is in the spotlight.

It is clear that the PEO-based polymer all-solid electrolyte exhibits excellent efficiency in terms of safety management of the lithium ion battery due to the relatively low ignition ability, and suppressed electrode volume expansion during charging and discharging, compared to a conventional liquid electrolyte. However, the PEO-based polymer all-solid electrolyte has lower ionic conductivity of about $10^{-5}$ S/cm, compared with the organic solvent electrolyte with an ionic conductivity ranging from $10^{-3}$ S/cm to $10^{-2}$ S/cm. This disadvantage acts as the biggest obstacle in application of the PEO-based polymer all-solid electrolyte to actual industrial sites.

Therefore, various studies are actively underway to compensate for the disadvantage of the low ionic conductivity of the PEO-based polymer all-solid electrolyte.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a black phosphorus-polymer composite solid electrolyte including a first polymer material received in a polymer network structure, and oxidized black phosphorus dispersed in the first polymer material, thereby to achieve high ionic conductivity and excellent mechanical properties.

Another of the present disclosure is to provide a production method of the black phosphorus-polymer composite solid electrolyte.

Still another purpose of the present disclosure is to provide a secondary battery having the black phosphorus-polymer composite solid electrolyte.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a black phosphorus-polymer composite solid electrolyte comprising: a polymer network structure in which nanofibers made of a second polymer material are connected to each other; a first polymer material received in the polymer network structure and having ionic conductivity; black phosphorus dispersed in the first polymer material, wherein the black phosphorus has an oxygen containing functional group introduced thereto; and a lithium salt compound or a sodium salt compound contained in the first polymer material.

In one implementation of the first aspect, the second polymer material includes at least one selected from a group consisting of polyvinylidene fluoro-hexafluoropropylene (PVDF-HFP), polyethylene oxide (PEO), polyacrylonitrile (PAN), polymethyl methacrylate (PMMA), and polyvinyl alcohol (PVA).

In one implementation of the first aspect, the first polymer material includes at least one selected from a group consisting of polyethylene oxide (PEO), polyethylene carbonate (PEC), polypropylene carbonate (PPC), and polytrimethylene carbonate (PTMC).

In one implementation of the first aspect, a content of the black phosphorus is in a range of 1 to 8 parts by weight based on 100 parts by weight of the first polymer material.

In one implementation of the first aspect, the black phosphorus is in a form of particles, each particle having a size of 25 to 300 nm.

In one implementation of the first aspect, a content of the lithium salt or the sodium salt is in a range of 5 to 10 parts by weight based on 100 parts by weight of the first polymer material.

A second aspect of the present disclosure provides a method for producing a black phosphorus-polymer composite solid electrolyte, the method comprising: dispersing oxidized black phosphorus, a first polymer material having ionic conductivity, and lithium salt or sodium salt into a first solvent to obtain a mixed solution; and impregnating a polymer network structure of nanofibers made of a second polymer material with the mixed solution.

In one implementation of the second aspect, the black phosphorus may be oxidized by an ozone treatment, a plasma treatment, or a photo oxidation treatment using oxygen and ultraviolet ray, and then the oxidized black phosphorus may be added into the first solvent.

In one implementation of the second aspect, a content of the first polymer material is in a range of 2 to 10 wt % based on a weight of the mixed solution.

In one implementation of the second aspect, a content of the oxidized black phosphorus is in a range of 1 to 6 parts by weight to 100 parts by weight of the first polymer material.

In one implementation of the second aspect, the first polymer material includes at least one selected from a group consisting of polyethylene oxide (PEO), polyethylene carbonate (PEC), polypropylene carbonate (PPC), and polytrimethylene carbonate (PTMC), wherein the second polymer material includes at least one selected from a group consisting of polyvinylidene fluoro-hexafluoropropylene (PVDF-HFP), polyethylene oxide (PEO), polyacrylonitrile (PAN), polymethyl methacrylate (PMMA), and polyvinyl alcohol (PVA).

In one implementation of the second aspect, the method further comprises dissolving the second polymer material in a second solvent to obtain a spinning solution, and electrospinning the spinning solution to obtain the polymer network structure.

In one implementation of the second aspect, the polymer network structure may be formed by crosslinking the second polymer material using the second polymer material, a crosslinking agent, and an initiator agent.

In one implementation of the second aspect, the polymer network structure has a fiber mat structure having a thickness of 5 to 100 μm.

In one implementation of the second aspect, impregnating and drying the polymer network structure includes impregnating the polymer network structure with the mixed solution for 1 to 2 hours and then drying the polymer network structure for 2 to 4 hours at a temperature of 60 to 100° C.

A third aspect of the present disclosure provides a secondary battery comprising: a first electrode; a second electrode facing away and being spaced apart from the first electrode; and a black phosphorus-polymer composite solid electrolyte disposed between the first electrode and the second electrode, wherein the black phosphorus-polymer composite solid electrolyte includes: a polymer network structure in which nanofibers made of a second polymer material are connected to each other; a first polymer material received in the polymer network structure and having ionic conductivity; black phosphorus dispersed in the first polymer material, wherein the black phosphorus has an oxygen containing functional group introduced thereto; and a lithium salt compound or a sodium salt compound contained in the first polymer material.

In one implementation of the third aspect, the polymer network structure has a fiber mat structure with a thickness of 5 to 100 μm, wherein a content of the black phosphorus is in a range of 1 to 8 parts by weight based on 100 parts by weight of the first polymer material.

Effects in accordance with the present disclosure may be as follows but may not be limited thereto.

According to the black phosphorus-polymer composite solid electrolyte according to the present disclosure and the secondary battery including the same, the solid electrolyte contains the black phosphorus containing abundant oxygen containing functional groups. Thus, the solid electrolyte may achieve high electrochemical stability and high ionic conductivity due to the oxygen containing functional groups.

In addition, the solid electrolyte not only contains the polymer network structure, but also an organic/inorganic composite structure between the polymer and the black phosphorus, thereby to achieve excellent mechanical properties. Further, the organic/inorganic composite structure may increase non-uniformity of the polymer network to increase the ionic conductivity of the solid electrolyte.

In addition to the effects as described above, specific effects in accordance with the present disclosure will be described together with the detailed description for carrying out the disclosure.

BRIEF DESCRIPTIONS OF DRAWINGS

Figure 4A:
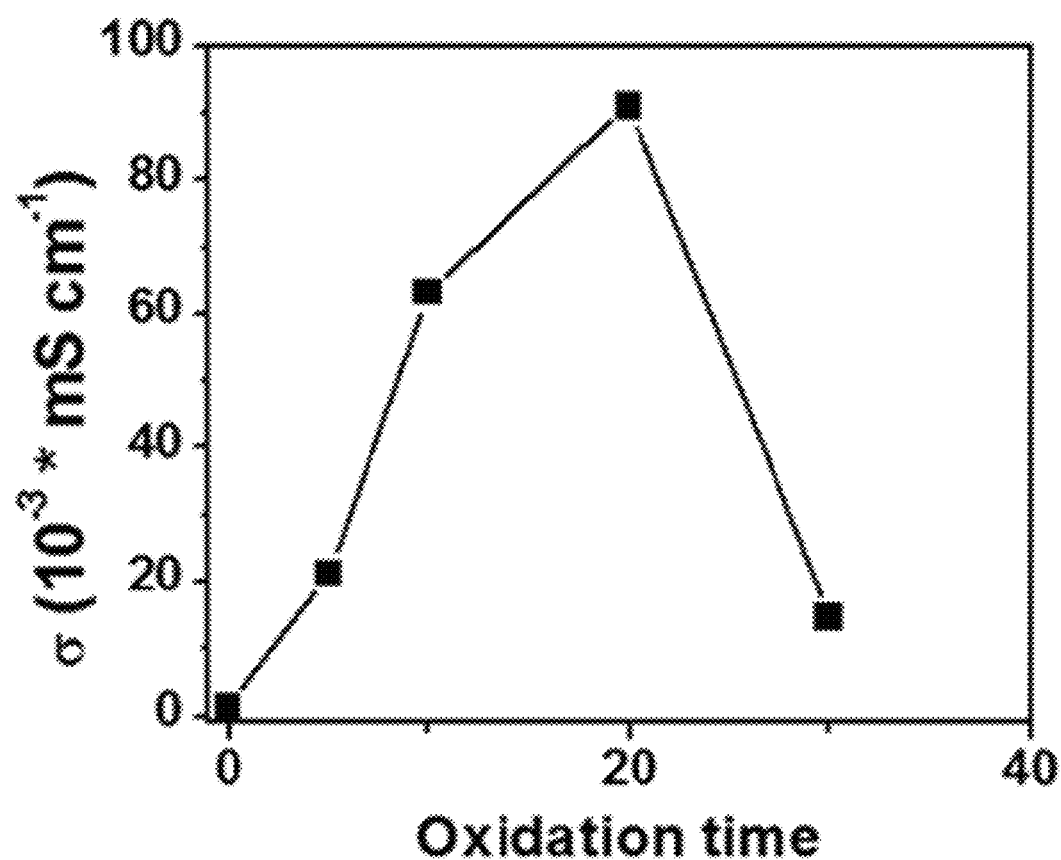
Figure 4B:
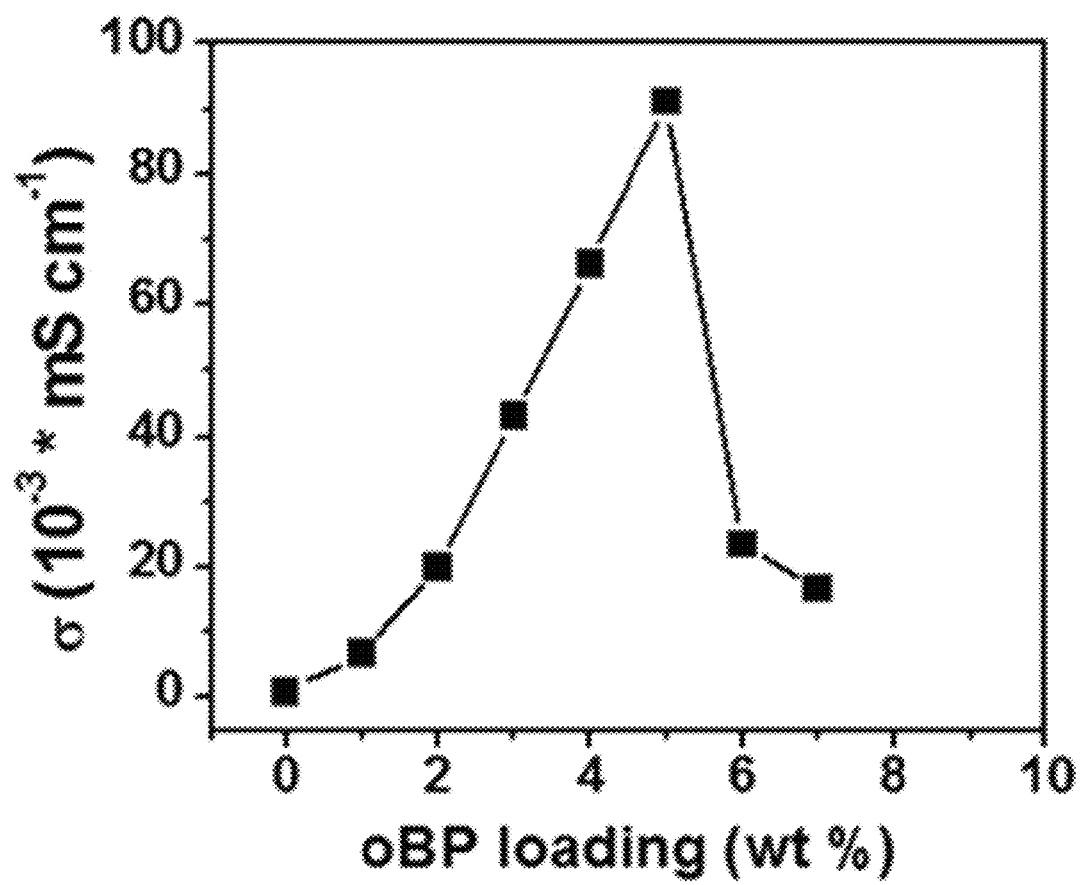
Figure 4C:
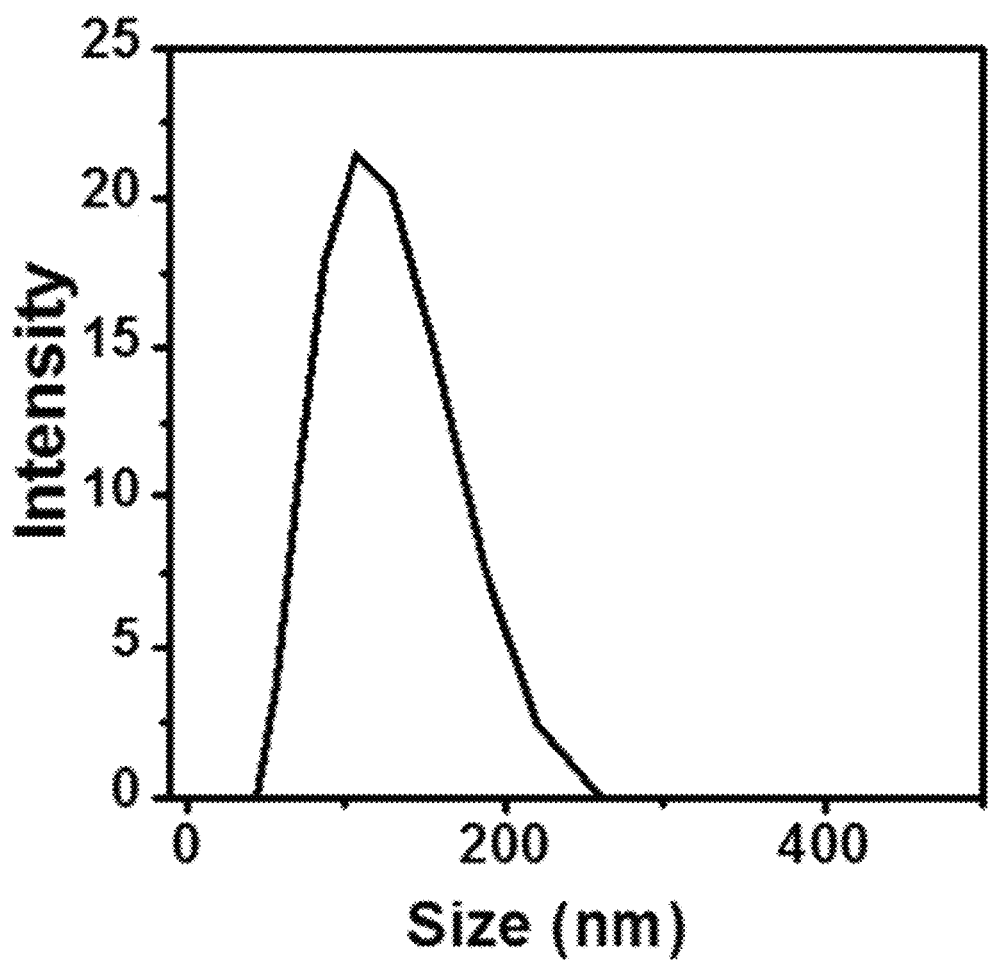

FIG. 4A shows a graph of a result of measuring change in an ionic conductivity of a black phosphorus-polymer composite solid electrolyte based on an ozone treatment time of black phosphorus, FIG. 4B shows a graph of a result of measuring change in ionic conductivity of a black phosphorus-polymer composite solid electrolyte based on a content of black phosphorus, and FIG. 4C show a graph of sizes of oxidized black phosphorus.

Figure 5A:
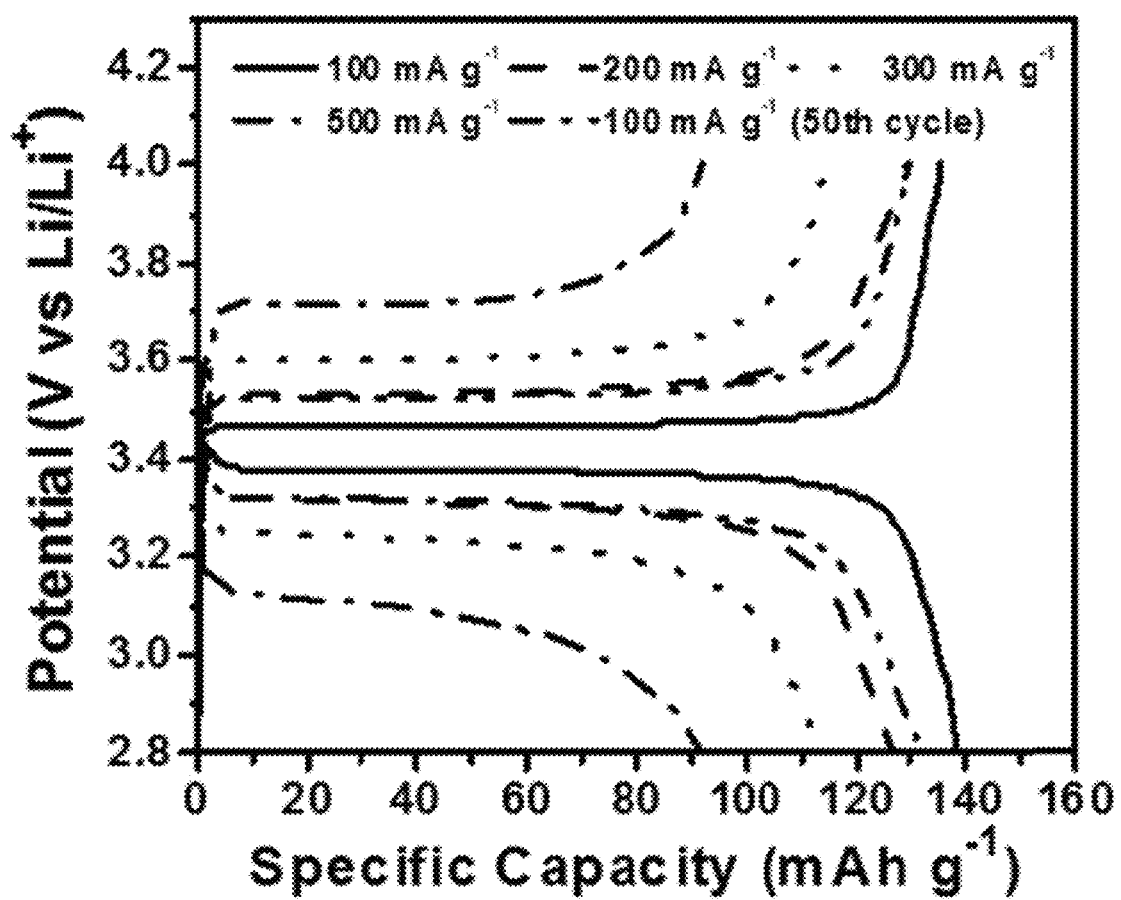
Figure 5B:
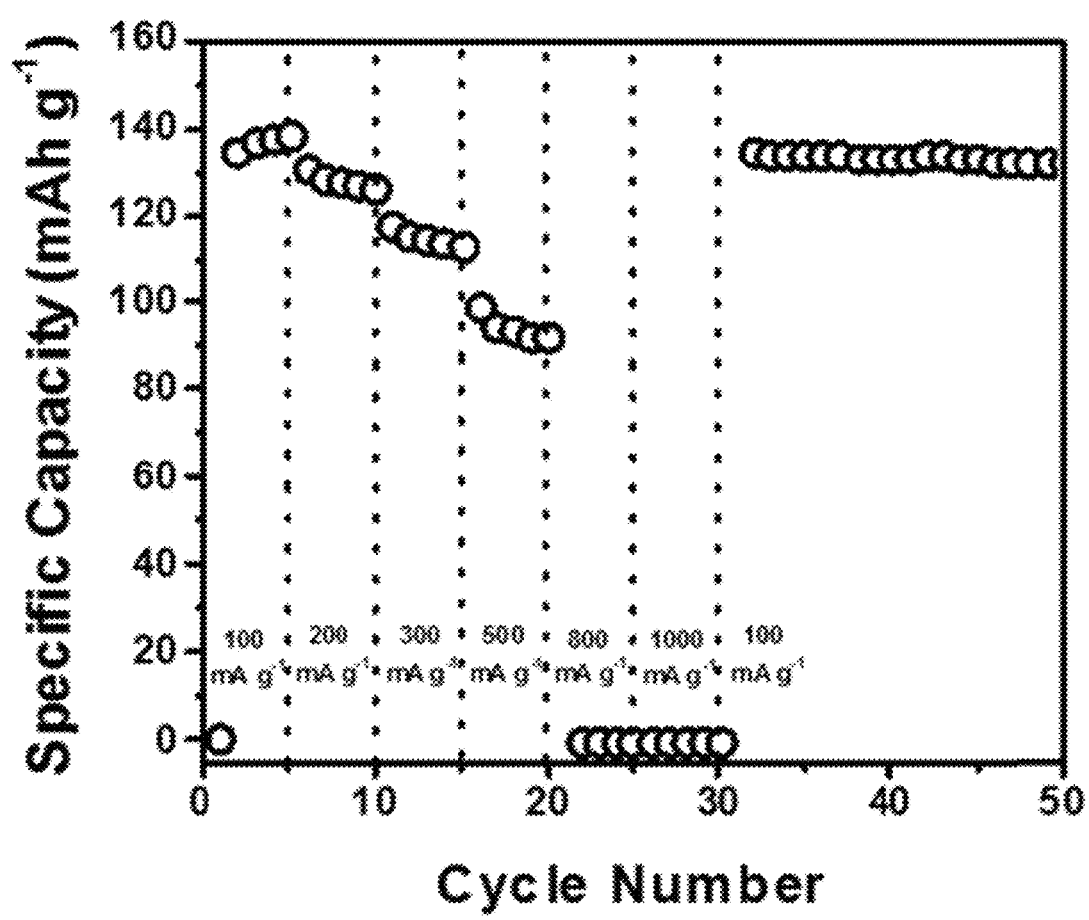

FIG. 5A and FIG. 5B show graphs of results of measuring a rate performance characteristics and cycle stability of a lithium secondary battery, respectively.

Figure 6:
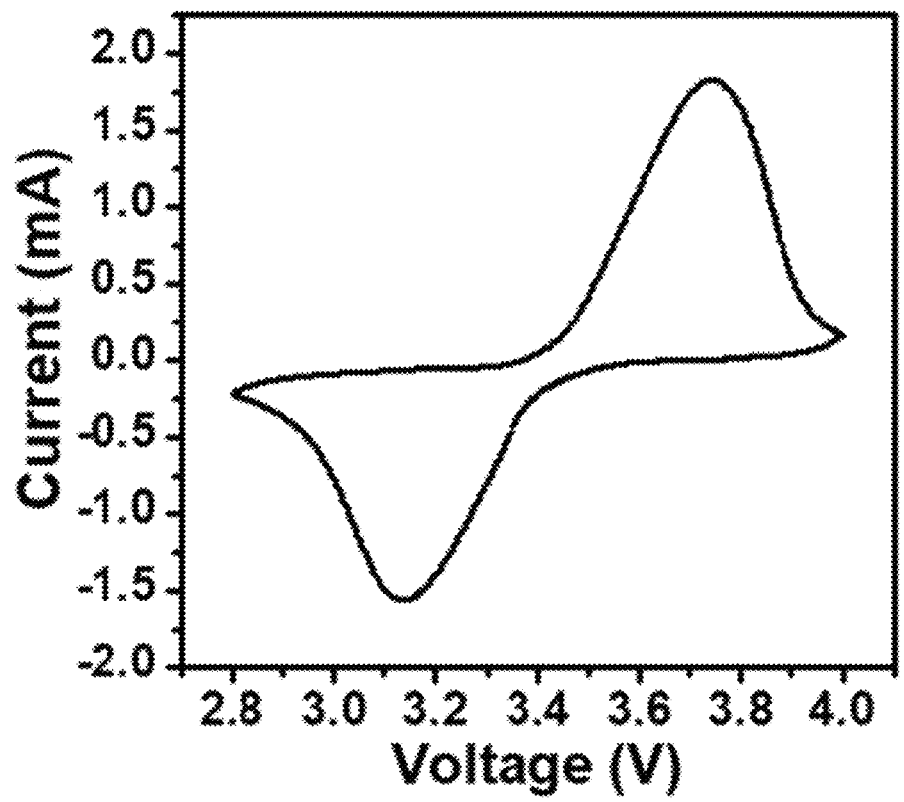

FIG. 6 shows a graph of a CV curve measured for a lithium secondary battery.

Figure 7:
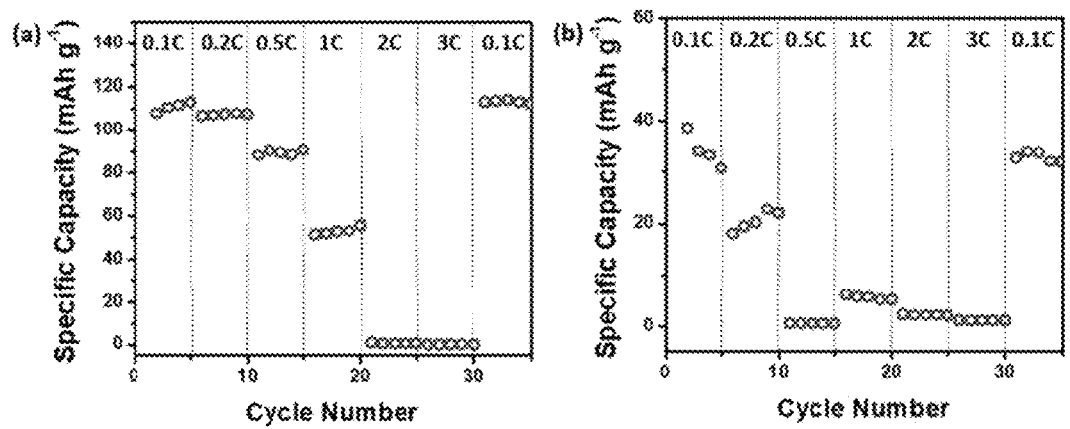

FIG. 7 shows cycle stability (a) of a lithium secondary battery having a black phosphorus-polymer composite solid electrolyte containing ozone-treated black phosphorus, and cycle stability (b) of a lithium secondary battery having a polymer solid electrolyte free of black phosphorus.

Figure 8A:
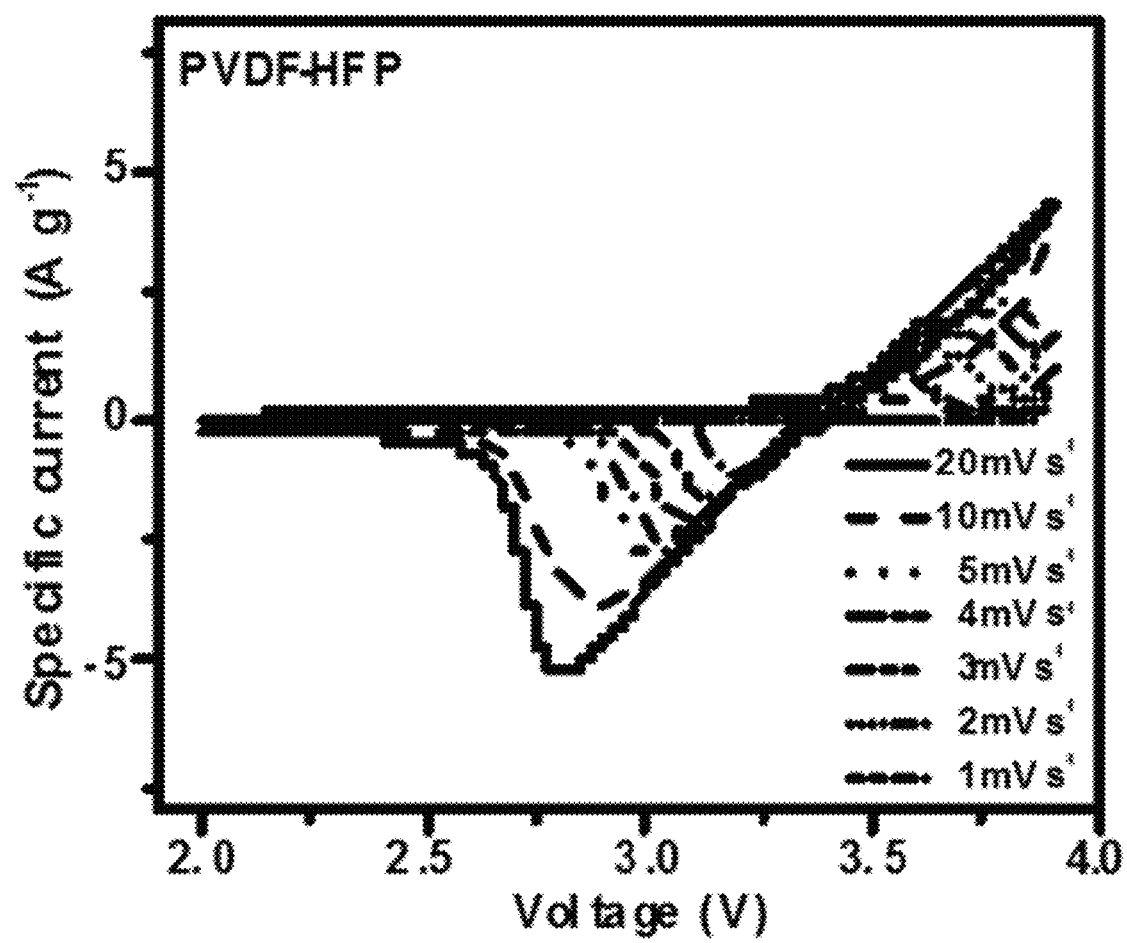
Figure 8B:
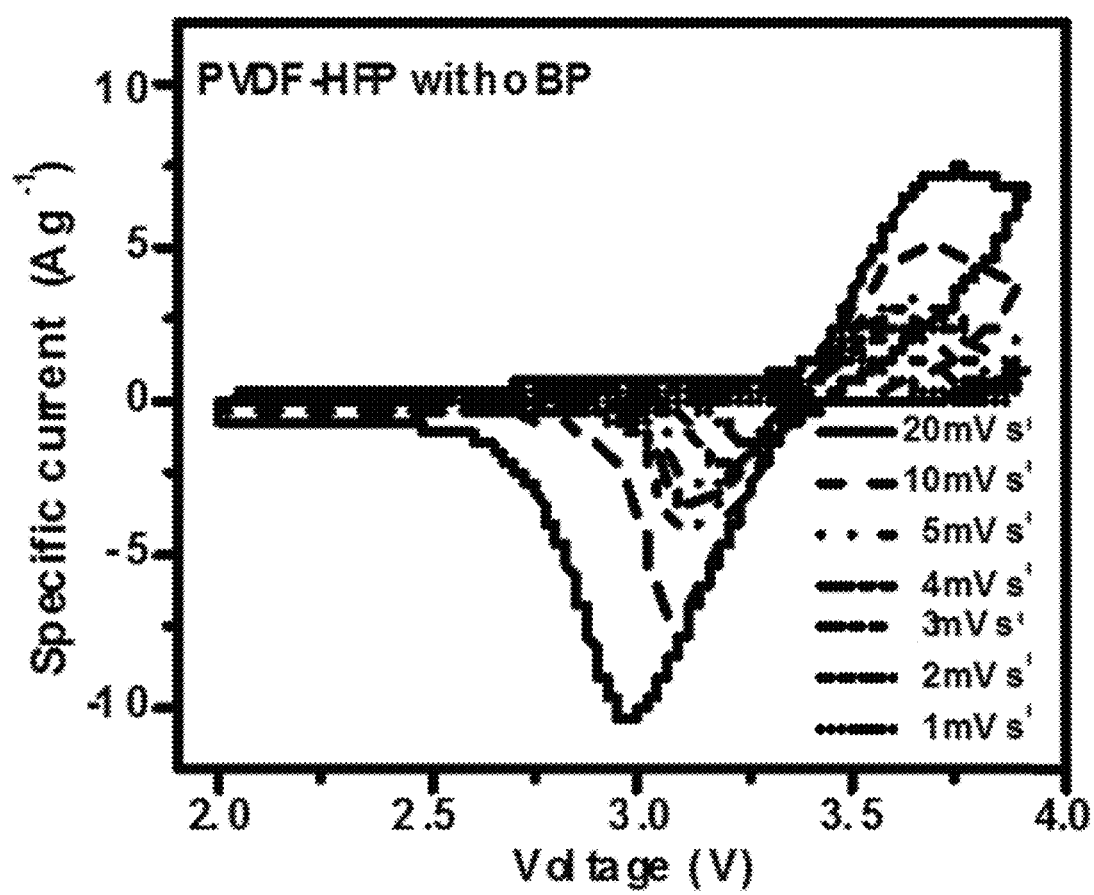

FIGS. 8A and 8B show graphs of voltage-current with respect to a sodium secondary battery including a polymer solid electrolyte which is not containing oxidized black phosphorus and a sodium secondary battery including a polymer solid electrolyte which is containing oxidized black phosphorus, respectively.

Figure 9A:
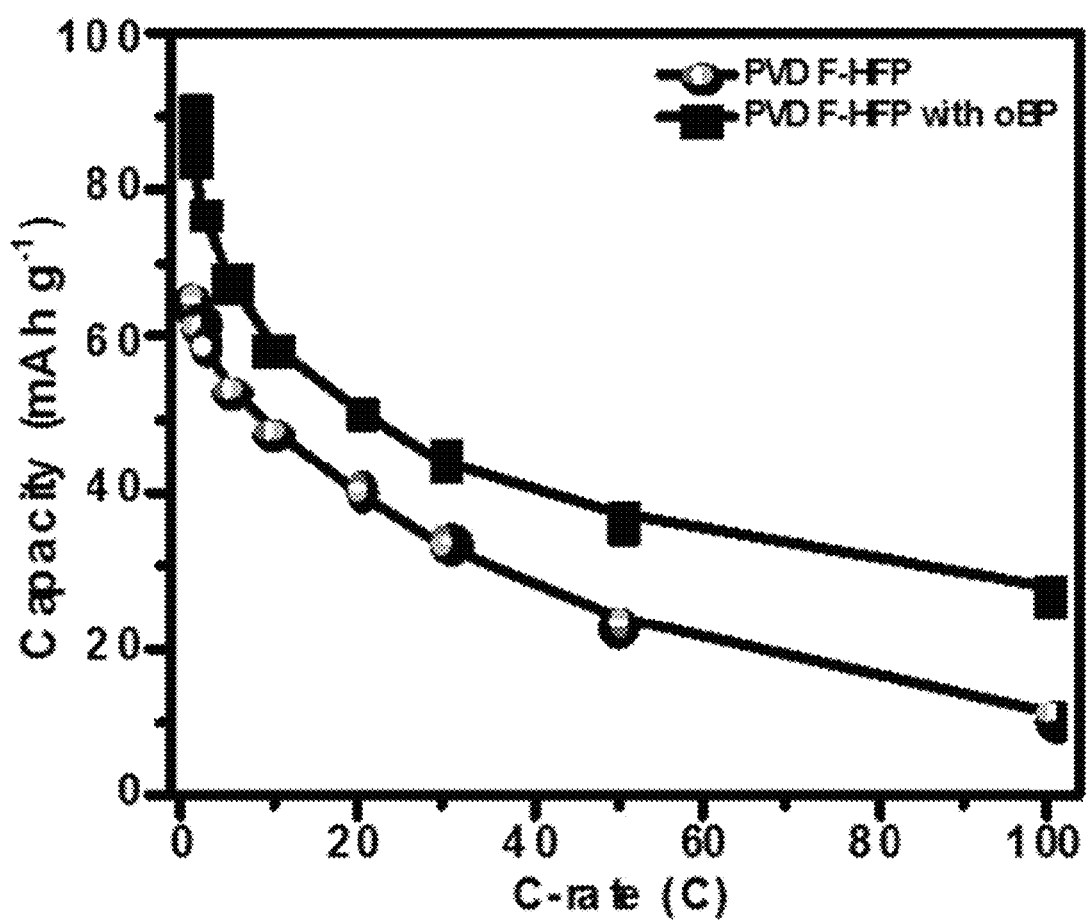
Figure 9B:
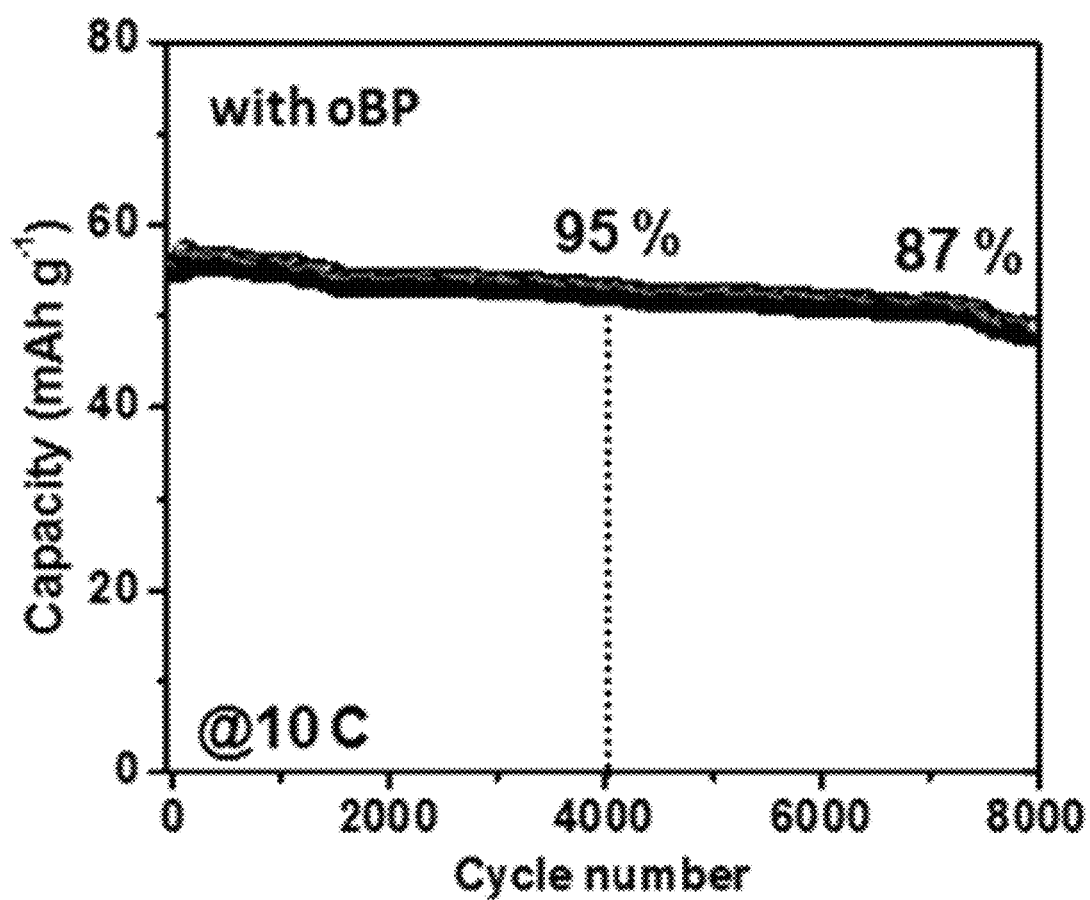

FIG. 9A is a graph of capacitance change based on discharge rate (C-rate) with respect to a sodium secondary battery including a polymer solid electrolyte which is not containing oxidized black phosphorus and a sodium secondary battery including a polymer solid electrolyte which is containing oxidized black phosphorus, and FIG. 9B is a graph of capacitance change based on charge/discharge cycle with respect to the sodium secondary battery including a polymer solid electrolyte which is containing oxidized black phosphorus.

DETAILED DESCRIPTIONS

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
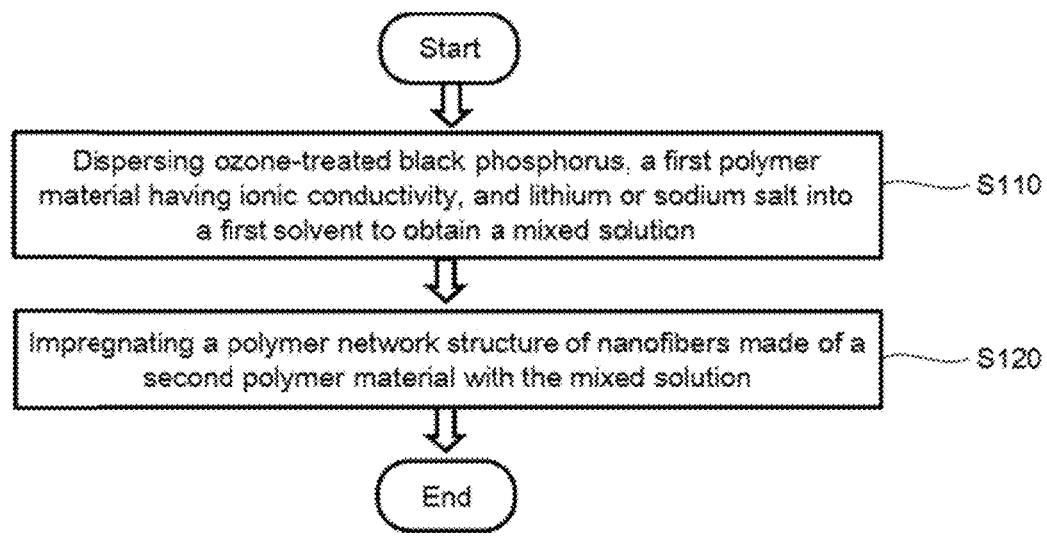
FIG. 1A and FIG. 1B are respectively a flow chart and a flow diagram for describing a production method of a black phosphorus-polymer composite solid electrolyte according to an embodiment of the present disclosure.
Figure 1B:
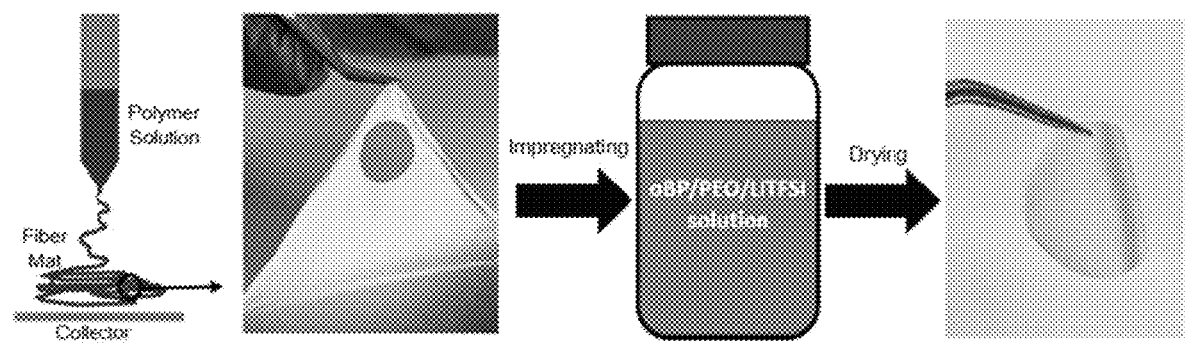

FIG. 1A and FIG. 1B are respectively a flow chart and a flow diagram for describing a production method of a black phosphorus-polymer composite solid electrolyte according to an embodiment of the present disclosure.

A production method of a black phosphorus-polymer composite solid electrolyte according to an embodiment of the present disclosure includes a first step S110 of dispersing oxidized black phosphorus, a first polymer material having ionic conductivity, and lithium salt or sodium salt into a solvent to obtain a mixed solution; and a second step S120 of impregnating a polymer network structure of fibers of a second polymer material with the mixed solution and drying the impregnated polymer network structure.

In the first step S110, the black phosphorus may be oxidized via ozone treatment, plasma treatment or photo oxidation treatment thereto before being mixed with the solvent. An oxygen containing functional group introduced into the black phosphorus via the ozone treatment, plasma treatment or photo oxidation treatment may not only improve the ionic conductivity of the black phosphorus-polymer composite solid electrolyte according to the present disclosure, but also improve the mechanical properties of the solid electrolyte due to formation of a composite structure of the organic and inorganic materials. The black phosphorus may be in a form of particles, each having a size of about 25 to 300 nm.

In one embodiment, when the black phosphorus may be oxidized via the ozone treatment, the black phosphorus may be treated with ozone for about 10 to 25 seconds. An amount of oxygen functional groups introduced into the black phosphorus may be controlled based on the ozone treatment time. Since the ionic conductivity of the solid electrolyte may vary based on the amount of the oxygen functional groups introduced thereto, the ozone treatment time for the black phosphorus is an important factor in improving the ionic conductivity of the solid electrolyte. When the ozone treatment time for the black phosphorus is smaller than 10 minutes or exceeds 25 minutes, a problem that the ionic conductivity of the solid electrolyte is lowered may occur.

The solvent of the mixed solution may include at least one selected from a group consisting of acetonitrile, dimethylformamide, dimethylacetamide, N-methyl-2-pyrrolidone, etc.

The first polymer material has excellent ionic conductivity, and a type thereof is not particularly limited as long as it may be applied for a polymer electrolyte of a secondary battery. For example, the first polymer material may include at least one selected from a group consisting of a polyethylene oxide (PEO) or polyethylene carbonate (PEC) or polypropylene carbonate (PPC), poly trimethylene carbonate (PTMC) having a carbonyl group (C=O), and the like. In the mixed solution, a content of the first polymer material may be about 2 to 10 wt % based on a total weight of the mixed solution.

A type of the lithium salt is not particularly limited as long as the lithium salt may be applied to a polymer electrolyte for secondary batteries. For example, the lithium salt may include at least one selected from a group consisting of LiTFSI(CF$_3$SO$_2$NLiSO$_2$CF$_3$), LiBF$_4$, LiAsF$_6$, LiBOB(Li(C$_2$O$_4$)$_2$), LiClO$_4$, LiPF$_6$, LiFSI, LiCF$_3$SO$_3$, etc. A type of the sodium salt is not particularly limited as long as the lithium salt may be applied to a polymer electrolyte for secondary batteries. For example, the sodium salt may include at least one selected from a group consisting of NaTFSI (CF$_3$SO$_2$NNaSO$_2$CF$_3$), NaFSI(FSO$_2$NNaSO$_2$F), NaBF$_4$, NaPF$_6$, NaClO$_4$, etc. In the mixed solution, a content of the lithium salt or the sodium salt may in a range of about 5 to 10 parts by weight based on 100 parts by weight of the first polymer material.

In one embodiment, a content of the oxidized black phosphorus may be in a range of about 1 to 8 parts by weight with respect to 100 parts by weight of the first polymer material. When the content of the black phosphorus is smaller than 1 part by weight or is greater than 8 parts by weight with respect to 100 parts by weight of the first polymer material, the ionic conductivity of the solid electrolyte may be deteriorated. For example, the content of the ozone-treated black phosphorus may be in a range of about 4 to 6 parts by weight with respect to 100 parts by weight of the first polymer material.

In the second step S120, the polymer network structure may be produced by electrospinning a spinning solution in which the second polymer material is dissolved in a solvent or by crosslinking the second polymer material using a cross linking agent and an initiator agent.

The polymer network structure may be composed of nanofibers made of the second polymer material and connected to each other. For example, the polymer network structure may have a fiber mat structure having a thickness of about 5 to 100 μm.

The second polymer material may include at least one selected from a group consisting of polyvinylidenefluoro-hexafluoropropylene (PVDF-HFP), polyethylene oxide (PEO), polyacrylonitrile (PAN), polymethyl methacrylate (PMMA), polyvinyl alcohol (PVA), and the like. The solvent of the spinning solution may include at least one selected from a group consisting of acetone, acetonitrile dimethylformamide, dimethylacetamide, N-methyl-2-pyrrolidone, etc.

When the polymer network structure may be produced by electrospinning the spinning solution, the spinning solution may be produced by adding the second polymer material to the solvent to form a mixture and stirring the mixture at a temperature of about 20 to 30° C. for about 0.5 to 2 hours. At this time, the second polymer material may be added at a content of about 5 to 15 wt %. In order to produce the polymer network structure, the spinning solution may be electrospun at a scanning rate of about 0.5 to 2 ml/min at a voltage condition of about 10 to 15 kV.

When the polymer network structure may be produced by crosslinking the second polymer material using the cross linking agent and the initiator agent, the second polymer material may be mixed with the cross linking agent and the initiator agent in a distilled water to form a polymer solution, and then the second polymer material may be cross linked using the cross linking agent to form the polymer network structure. When forming the polymer solution, argon gas may be injected to the polymer solution to remove dissolved oxygen from the polymer solution. In an example embodiment, the polymer solution may be stirred at about 70 to 90° C. for about 0.5 to 2 hours to cross link the second polymer material. For example, the crosslinking agent may include at least one of Methylenebisacrylamide (MBAA), Ethylene glycol dimethacrylate, Ethylene glycol diglycidyl ether, Hexanediol diacrylate, N,N-diallylacrylamide, Divinylbenzene, etc. For example, the initiator agent may include at least one of Ammonium persulfate (APS), Potassium persulfate (KPS), etc.

The polymer network structure may be impregnated with the mixed solution for about 1 to 2 hours, and then, may be dried at a temperature of about 60 to 100° C. for about 2 to 4 hours.

The black phosphorus-polymer composite solid electrolyte as produced by the method may have a structure in which the first polymer material, the lithium or sodium salt and the oxidized black phosphorus are carried in the polymer network structure. In this connection, the lithium or sodium salt and the oxidized black phosphorus may be present in a uniformly dispersed state in the first polymer material.

In one embodiment, the oxidized black phosphorus may be in a form of particles, each having a size of about 100 to 300 nm. A content of the oxidized black phosphorus may be in a range of about 4 to 6 parts by weight based on 100 parts by weight of the first polymer material. A content of the lithium or sodium salt may be in a range of about 5 to 10 parts by weight based on 100 parts by weight of the first polymer material.

Figure 2:
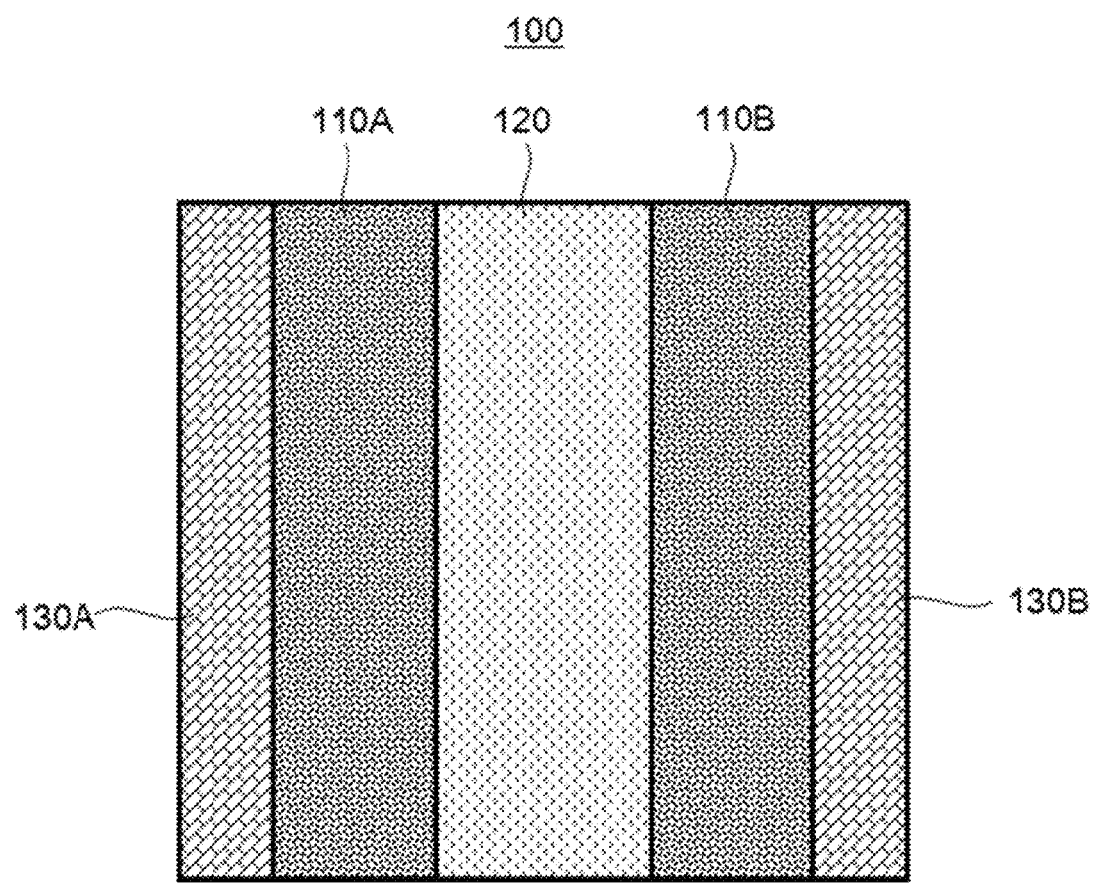
FIG. 2 is a cross-sectional view illustrating a lithium secondary battery according to an embodiment of the present disclosure.

FIG. 2 is a cross-sectional view illustrating a secondary battery according to an embodiment of the present disclosure.

Referring to FIG. 2, a secondary battery 100 according to an embodiment of the present disclosure may include a first electrode 110A, a second electrode 110B and an electrolyte 120.

The first electrode 110A and the second electrode 110B may face each other in a spaced apart state from each other.

The first electrode 110A may act as a cathode electrode, while the second electrode 110B may act as an anode electrode, or vice versa. The first and second electrodes 110A and 110B may respectively employ known cathode and anode electrodes for a secondary battery without limitation.

The electrolyte 120 may be disposed between the first electrode 110A and the second electrode 110B. The electrolyte 120 may include the black phosphorus-polymer composite solid electrolyte as described above. Therefore, detailed description thereof will be omitted.

In one example, the lithium secondary battery 100 according to an embodiment of the present disclosure may further include a first current collector 130A electrically connected to the first electrode 110A, and a second current collector 130B electrically connected to the second electrode 110B. Each of the first current collector 130A and the second current collector 130B may employ a known structure and a known material of a secondary battery current collector without limitation.

According to the black phosphorus-polymer composite solid electrolyte according to the present disclosure and the secondary battery including the same, the solid electrolyte contains the black phosphorus containing abundant oxygen containing functional groups. Thus, the solid electrolyte may achieve high electrochemical stability and high ionic conductivity due to the oxygen functional groups.

In addition, the solid electrolyte not only contains the polymer network structure, but also an organic/inorganic composite structure between the polymer and the black phosphorus, thereby to achieve excellent mechanical properties. Further, the organic/inorganic composite structure may increase non-uniformity of the polymer network to increase the ionic conductivity of the solid electrolyte.

Hereinafter, specific examples and test examples according to the present disclosure will be described. However, the following examples are only some implementations according to the present disclosure. Thus, the scope of the present disclosure is not limited to the following examples.

Production of Black Phosphorus-Polymer Composite Solid Electrolyte

Black phosphorus is treated with ozone for 20 seconds at 80% efficiency. Then, the ozone-treated black phosphorus, PEO (polyethylene oxide) and LITFSI (lithium bis (trifluoromethane sulfonyl) imide) are added into an acetonitrile solvent to produce a mixed solution. In this connection, PEO is added at a content of 4 wt %, LITFSI is added such that a weight ratio (PEO/Li) of PEO to lithium salt (Li) is 10, and the black phosphorus (BP) is added so that a weight ratio (BP/PEO) of BP to PEO is 0.05.

Subsequently, the polymer network structure is formed and then is impregnated with the mixed solution for 1 hour, and then dried at 80° C. for 3 hours, thereby to produce a black phosphorus-polymer composite solid electrolyte.

To produce the polymer network structure, PVDF-HFP (polyvinylidene fluoride-co-hexafluoropropylene) is added to an acetonitrile solvent at a content of 10 wt % to form a mixture which in turn is stirred at 25° C. for 1 hour to produce a spinning solution. Then, the spinning solution is electrospun at an 11 kV spinning voltage and a scanning rate of 1 ml/min to produce a 70 μm thick nanofiber mat.

Production of Lithium Secondary Battery

A lithium secondary battery half-cell is produced using the black phosphorus-polymer composite solid electrolyte as an electrolyte and an isolation film. In this connection, a working electrode is formed using LFP (LiFePO$_4$) as an active material. Each of a counter electrode and a reference electrode is made of lithium metal.

Electrochemical performance of the lithium secondary battery half-cell is evaluated using a CR2016 type coin cell two-electrode system.

Test Example 1

Figure 3:
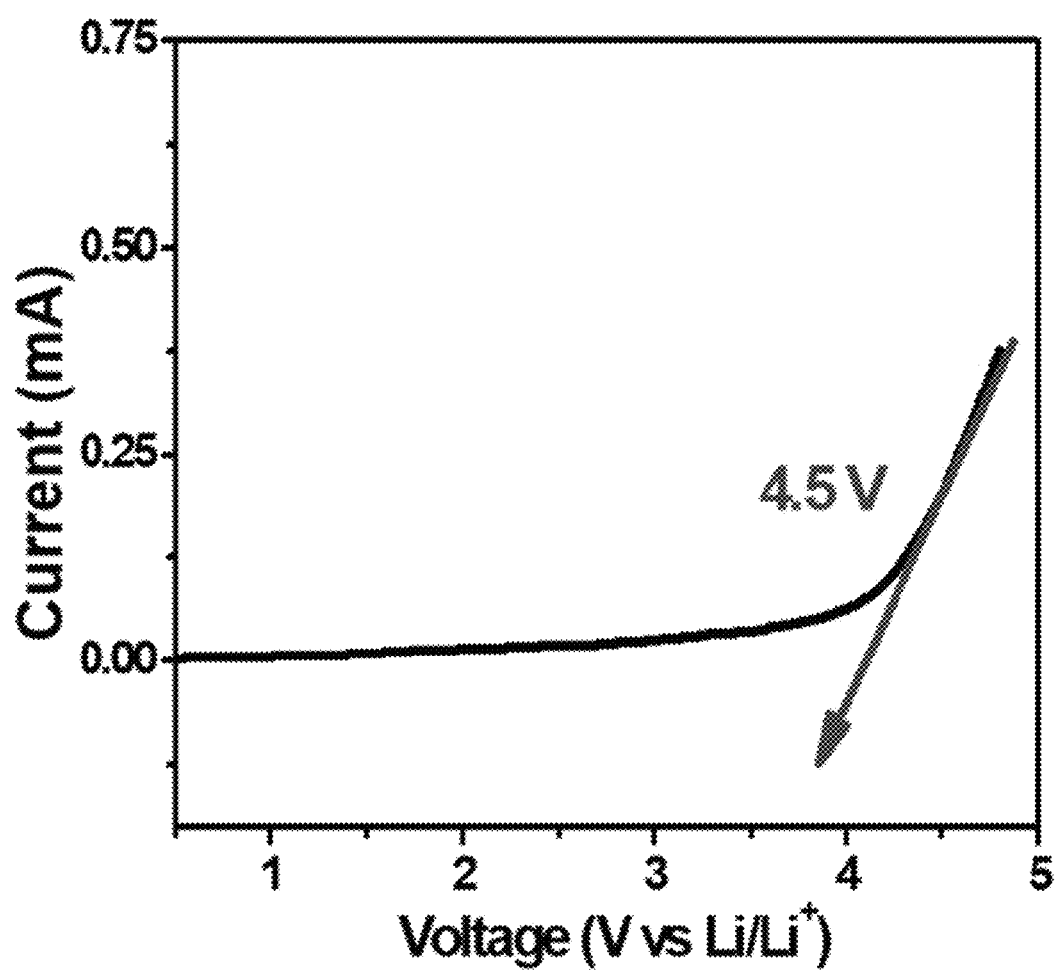
FIG. 3 shows LSV data of a black phosphorus-polymer composite solid electrolyte.

FIG. 3 shows LSV data of a black phosphorus-polymer composite solid electrolyte.

Referring to FIG. 3, it may be seen that the black phosphorus-polymer composite solid electrolyte provides a high-range potential window.

FIG. 4A shows a graph of a result of measuring change in an ionic conductivity of a black phosphorus-polymer composite solid electrolyte based on an ozone treatment time of black phosphorus. FIG. 4B shows a graph of a result of measuring change in ionic conductivity of a black phosphorus-polymer composite solid electrolyte based on a content of black phosphorus. FIG. 4C show a graph of sizes of oxidized black phosphorus.

Referring to FIG. 4A, it is found that the black phosphorus-polymer composite solid electrolyte having the black phosphorus treated with ozone for 20 seconds has the highest ionic conductivity. It is identified that when the ozone treatment time exceeded 20 seconds, the ionic conductivity of the black phosphorus-polymer composite solid electrolyte decreases rapidly. Further, it is identified that the ionic conductivity of the black phosphorus-polymer composite solid electrolyte increases rapidly until the ozone treatment time reaches 10 seconds.

Thus, it is confirmed that the ozone treatment for the black phosphorus is preferably performed for 10 seconds to 25 seconds, particularly, for 20 seconds.

Referring to FIG. 4B, it is found that the black phosphorus-polymer composite solid electrolyte has the highest ionic conductivity when the content of black phosphorus treated with ozone for 20 seconds is 5 wt %. When the content of the black phosphorus exceeds 5 wt %, the ionic conductivity rapidly decreases. When the content thereof exceeds 6 wt %, the ionic conductivity decreases gradually. Further, the ionic conductivity thereof gradually increases until the content of the black phosphorus reaches 1 wt %. Then, when the content thereof is in a range of 2 wt % and 5 wt %, the ionic conductivity thereof increases rapidly as the content of the black phosphorus increases.

Thus, it may be confirmed that the content of the black phosphorus is preferably in a range of 2 wt % to 6 wt %, and is more preferably 5 wt %.

Referring to FIG. 4C, sizes of the oxidized black phosphorus may be in a range of about 50 to about 300 nm. Mean size of the oxidized black phosphorus is about 100 nm.

Test Example 2

FIG. 5A and FIG. 5B show graphs of results of measuring a rate performance characteristics and cycle stability of a lithium secondary battery, respectively. FIG. 6 shows a graph of a CV curve measured for a lithium secondary battery.

Referring to FIG. 5A, FIG. 5B and FIG. 6, it may be identified that the lithium secondary battery produced using the method of according to the present disclosure has excellent electrochemical performance and cycle stability.

FIG. 7 shows cycle stability (a) of a lithium secondary battery having a black phosphorus-polymer composite solid electrolyte containing ozone-treated black phosphorus, and cycle stability (b) of a lithium secondary battery having a polymer solid electrolyte free of black phosphorus.

Referring to FIG. 7, it is identified that a lithium secondary battery having a black phosphorus-polymer composite solid electrolyte containing ozone-treated black phosphorus has better cycle stability than that of a lithium secondary battery having a polymer solid electrolyte free of black phosphorus.

FIGS. 8A and 8B show graphs of voltage-current with respect to a sodium secondary battery including a polymer solid electrolyte which is not containing oxidized black phosphorus and a sodium secondary battery including a polymer solid electrolyte which is containing oxidized black phosphorus, respectively.

Referring to FIGS. 8A AND 8B, in comparison with the sodium secondary battery including a polymer solid electrolyte which is not containing oxidized black phosphorus, despite rapid scan rate, in the sodium secondary battery including a polymer solid electrolyte which is containing oxidized black phosphorus, apparent oxidation-reduction peaks appeared and polarization between the oxidation peak and the reduction peak was decreased. Thus, it is confirmed that the oxidized black phosphorus increases chemical reaction velocity of sodium ions.

FIG. 9A is a graph of capacitance change based on discharge rate (C-rate) with respect to a sodium secondary battery including a polymer solid electrolyte which is not containing oxidized black phosphorus and a sodium secondary battery including a polymer solid electrolyte which is containing oxidized black phosphorus, and FIG. 9B is a graph of capacitance change based on charge/discharge cycle with respect to the sodium secondary battery including a polymer solid electrolyte which is containing oxidized black phosphorus.

Referring FIGS. 9A and 9B, in comparison with the sodium secondary battery including a polymer solid electrolyte which is not containing oxidized black phosphorus, the sodium secondary battery including a polymer solid electrolyte which is containing oxidized black phosphorus has higher capacitance. Although discharge rate is increased, change of capacitance of the sodium secondary battery including a polymer solid electrolyte which is containing oxidized black phosphorus is lower than that of the sodium secondary battery including a polymer solid electrolyte which is not containing oxidized black phosphorus.

After 8000 cycles of charge/discharge, a capacitance of the sodium secondary battery including a polymer solid electrolyte which is containing oxidized black phosphorus remains about 87% of initial capacitance.

Descriptions of the presented embodiments are provided to enable any person skilled in the art of the present disclosure to use or implement the present disclosure. Various modifications to these embodiments will be apparent to those skilled in the art of the present disclosure, and the general principles defined herein may be applied to other embodiments without departing from the scope of the present disclosure. Thus, the present disclosure is not limited to the embodiments presented herein, but should be interpreted in the broadest scope consistent with the principles and novel features presented herein.

What is claimed is:

1. A black phosphorus-polymer composite solid electrolyte comprising:
   a polymer network structure in which nanofibers made of a second polymer material are connected to each other;
   a first polymer material received in the polymer network structure and having ionic conductivity;
   black phosphorus included in the first polymer material, wherein the black phosphorus has an oxygen containing functional group; and
   a lithium or sodium salt compound included in the first polymer material.

2. The black phosphorus-polymer composite solid electrolyte of claim 1, wherein the second polymer material includes at least one selected from a group consisting of polyvinylidene fluoro-hexafluoropropylene (PVDF-HFP), polyethylene oxide (PEO), polyacrylonitrile (PAN), polymethyl methacrylate (PMMA), and polyvinyl alcohol (PVA).

3. The black phosphorus-polymer composite solid electrolyte of claim 1, wherein the first polymer material includes at least one selected from a group consisting of polyethylene oxide (PEO), polyethylene carbonate (PEC), polypropylene carbonate (PPC), and polytrimethylene carbonate (PTMC).

4. The black phosphorus-polymer composite solid electrolyte of claim 1, wherein a content of the black phosphorus is in a range of 1 to 8 parts by weight based on 100 parts by weight of the first polymer material.

5. The black phosphorus-polymer composite solid electrolyte of claim 4, wherein the black phosphorus is in a form of particles, each particle having a size of 25 to 300 nm.

6. The black phosphorus-polymer composite solid electrolyte of claim 4, wherein a content of the lithium or sodium salt is in a range of 5 to 10 parts by weight based on 100 parts by weight of the first polymer material.

7. A method for producing a black phosphorus-polymer composite solid electrolyte, the method comprising:
   dispersing oxidized black phosphorus, a first polymer material having ionic conductivity, and lithium or sodium salt into a first solvent to obtain a mixed solution; and
   impregnating a polymer network structure of nanofibers made of a second polymer material with the mixed solution.

8. The method of claim 7, wherein the black phosphorus is oxidized by ozone treatment, plasma treatment or photo oxidation treatment, and then is added to the first solvent.

9. The method of claim 7, wherein when the black phosphorus is oxidized by the ozone treatment, the black phosphorus is treated with ozone for 10 to 25 seconds.

10. The method of claim 7, wherein a content of the first polymer material is in a range of 2 to 10 wt % based on a weight of the mixed solution.

11. The method of claim 7, wherein a content of the oxidized black phosphorus is in a range of 1 to 8 parts by weight to 100 parts by weight of the first polymer material.

12. The method of claim 7, wherein the first polymer material includes at least one selected from a group consisting of polyethylene oxide (PEO), polyethylene carbonate (PEC), polypropylene carbonate (PPC), and polytrimethylene carbonate (PTMC),
   wherein the second polymer material includes at least one selected from a group consisting of polyvinylidene fluoro-hexafluoropropylene (PVDF-HFP), polyethylene oxide (PEO), polyacrylonitrile (PAN), polymethyl methacrylate (PMMA), and polyvinyl alcohol (PVA).

13. The method of claim 12, wherein the polymer network structure is formed by electrospinning a spinning solution which is formed by dissolving the second polymer material in a second solvent.

14. The method of claim 12, wherein the polymer network structure is formed by crosslinking the second polymer material using a cross linking agent and an initiator agent.

15. The method of claim 7, wherein the polymer network structure has a fiber mat structure having a thickness of 5 to 100 μm.

16. The method of claim 7, wherein impregnating and drying the polymer network structure includes impregnating the polymer network structure with the mixed solution for 1 to 2 hours and then drying the polymer network structure for 2 to 4 hours at a temperature of 60 to 100° C.

17. A secondary battery comprising:
   a first electrode;
   a second electrode facing away and being spaced apart from the first electrode; and
   a black phosphorus-polymer composite solid electrolyte disposed between the first electrode and the second electrode,
   wherein the black phosphorus-polymer composite solid electrolyte includes:
   a polymer network structure in which nanofibers made of a second polymer material are connected to each other;
   a first polymer material received in the polymer network structure and having ionic conductivity;
   black phosphorus included in the first polymer material, wherein the black phosphorus has an oxygen containing functional group; and
   a lithium or sodium salt compound contained in the first polymer material.

18. The secondary battery of claim 17, wherein the polymer network structure has a fiber mat structure with a thickness of 5 to 100 μm,
   wherein a content of the black phosphorus is in a range of 1 to 8 parts by weight based on 100 parts by weight of the first polymer material.

* * * * *